United States Patent [19]

Boelkins

[11] Patent Number: 4,951,976
[45] Date of Patent: Aug. 28, 1990

[54] CONNECTOR FOR SOFT-WALLED CONDUIT SUCH AS POLYURETHANE HOSE

[75] Inventor: Wallace G. Boelkins, Grand Rapids, Mich.

[73] Assignee: Uni-Mist, Inc., Grand Rapids, Mich.

[21] Appl. No.: 242,971

[22] Filed: Sep. 12, 1988

[51] Int. Cl.⁵ .................................................. F16L 35/00
[52] U.S. Cl. ..................................... 285/114; 285/247; 285/423
[58] Field of Search ............ 285/247, 245, 246, 334.5, 285/382.7, 341, 256, 114, 115, 116, 423

[56] References Cited

U.S. PATENT DOCUMENTS

| | | | |
|---|---|---|---|
| 772,136 | 10/1904 | Dossert | 285/332.4 |
| 953,422 | 3/1910 | Just | 285/114 |
| 1,738,915 | 12/1929 | Mueller | 285/173 |
| 2,266,211 | 12/1941 | Kaiser | 285/247 |
| 2,516,583 | 7/1950 | Moore | 285/114 |
| 2,551,536 | 5/1951 | Harvey | 285/84 |
| 2,697,620 | 12/1954 | Margrave | 285/86 |
| 2,782,059 | 2/1957 | Stranberg | 285/247 |
| 2,853,320 | 9/1958 | Liebelt et al. | 285/247 |
| 3,017,203 | 1/1962 | MacLeod | 285/256 |
| 3,246,921 | 4/1966 | Lyon | 285/247 |
| 4,025,093 | 5/1977 | Leczycki | 285/382.7 X |
| 4,111,469 | 9/1978 | Kavick | 285/256 |
| 4,437,689 | 3/1984 | Goebel et al. | 285/246 |
| 4,548,428 | 10/1985 | Ruhle | 285/90 |
| 3,833,2246 | 9/1974 | Wake | 285/247 |

FOREIGN PATENT DOCUMENTS

| | | | |
|---|---|---|---|
| 207257 | 10/1955 | Australia | 285/247 |
| 214691 | 1/1958 | Australia | 285/247 |
| 1251112 | 9/1967 | Fed. Rep. of Germany . | |
| 1258219 | 1/1968 | Fed. Rep. of Germany | 285/247 |
| 1032711 | 7/1953 | France | 285/247 |
| 1147894 | 12/1957 | France . | |
| 325031 | 4/1936 | Italy . | |
| 493599 | 8/1955 | Italy . | |
| 801997 | 9/1958 | United Kingdom . | |

Primary Examiner—Dave W. Arola
Attorney, Agent, or Firm—Price, Heneveld, Cooper, DeWitt & Litton

[57] ABSTRACT

A connector specially suited for coupling soft resilient hose, in particular polyurethane hose, includes complementary male and female members defining a pair of concentric and generally parallel conical surfaces which receive therebetween the end of the hose to be engaged. At least one sharp circumferential barb is fixedly positioned along the conical surface of the male member to bite into the inner sidewall of the hose, to thereby effectively prevent the hose from slipping off the connector during assembly or subsequent use. The two complementing members are also provided with a pair of cooperating annular shoulders which abuttingly engage when the two members are joined together, to position the conical surface of the male member completely within the female member and thereby eliminate the danger of cutting and for damaging the hose along a projecting edge of the connector. Such abutment of shoulders also indexes the concentric conical clamping surfaces a predetermining distance apart to produce a particular desired compression of the hose wall, and additionally indexes corresponding nut portions on the male and female members in mutually-spaced relationship to more easily engage tools used during assembly and installation of the connector.

10 Claims, 1 Drawing Sheet

CONNECTOR FOR SOFT-WALLED CONDUIT SUCH AS POLYURETHANE HOSE

BACKGROUND OF THE INVENTION

The present invention pertains to hose connectors, and in particular to a connector which is specially suited for soft-walled conduit, especially hose composed of polyurethane.

Polyurethane hose is becoming increasingly popular due to its abrasion resistance, oil resistance, flexibility (even under cold operating temperatures) and light weight. However, presently-known hose connector devices are inadequate for use with polyurethane hose. More specifically, connecting devices which fail to completely circumscribe and uniformly compress the polyurethane hose inevitably suffer from leakage of the fluid being passed therethrough. Furthermore, polyurethane hose has a pronounced tendency to cold-flow or "creep", and will slip out of connectors which merely attempt to clamp the hose wall between a pair of compressing elements. Also, due to its softness, polyurethane hose is susceptible to cutting along protruding edges of connectors, and its operative life is thereby prematurely ended by many types of conventional hose connectors designed for other materials.

SUMMARY OF THE INVENTION

The aforementioned problems and deficiencies are overcome in the present invention, wherein a hose connector is provided which securely grips soft-walled hose or conduit (e.g., polyurethane hose) and which effectively eliminates leakage, slipping or cutting of the hose.

The hose connector in accordance herewith includes a pair of cooperatively-assembled male and female components. The male component is provided with an axial bore and a frustum end having a frustoconically-shaped exterior surface adapted to enter, engage, and secure an end of the hose. The female component has a conically-tapering internal passage disposed to overlie and surround the frustoconical surface on the male component, to clamp the hose therebetween.

The hose is flared outwardly and expanded as it is telescoped over the frustoconical surface, and at least one sharp concentric barb is formed on the frustum end to engage the inside surface of the hose and prevent slippage of the hose from the frustum end. The complementary concentric conically-tapered surfaces of the two components are disposed parallel to one another and clamp the flared portion of the hose between them. Furthermore, cooperative shoulders are provided and positioned on the two components, the mutual engagement of which ensures that the juxtaposed conical clamping surfaces define a particular clearance therebetween, thereby establishing a predetermined amount of compression for the wall of the hose disposed between such surfaces. Also, such engaging shoulders ensure that the frustum end of the male component does not protrude beyond the female component when such components are fully engaged together, thereby alleviating the danger of cutting or raising undesirable high stress concentrations and thereby ruining the hose.

These and other objects, advantages and features of the present invention will be more fully understood and appreciated by reference to the written specification and appended drawings

DETAILED DESCRIPTION OF THE PREFERRED EMBODIMENTS

Figure 1:
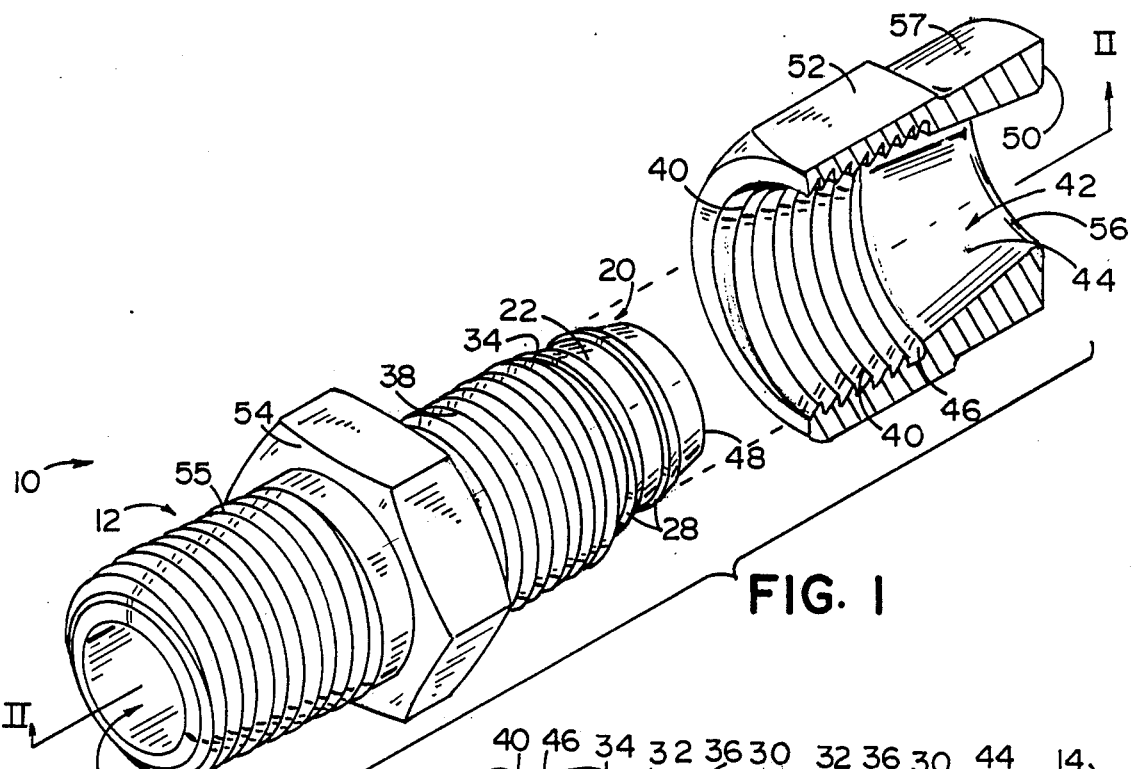
FIG. 1 is an exploded perspective view, partially broken away, of a convector in accordance with the present invention.

In the preferred embodiment, hose connector 10 includes a male component 12 and a corresponding female component 14. Male and female components 12, 14 cooperatively interlock to securely engage the end of a soft-walled hose 16 for coupling purposes. While connector 10 of the present invention is specially suited for use in coupling polyurethane hose, hoses of other similar materials may likewise be secured.

Male component 12 is preferably made of a metallic material, such as brass, but of course could be composed of a variety of other materials having the requisite characteristics. The male component 12 is fabricated as a single unitary piece having a central, axial bore 18 passing therethrough. Bore 18 is preferably dimensioned to substantially equal the inner diameter of the hose 16 to be secured, to thereby avoid any restriction of the fluid flow being conveyed therethrough.

Figure 2:
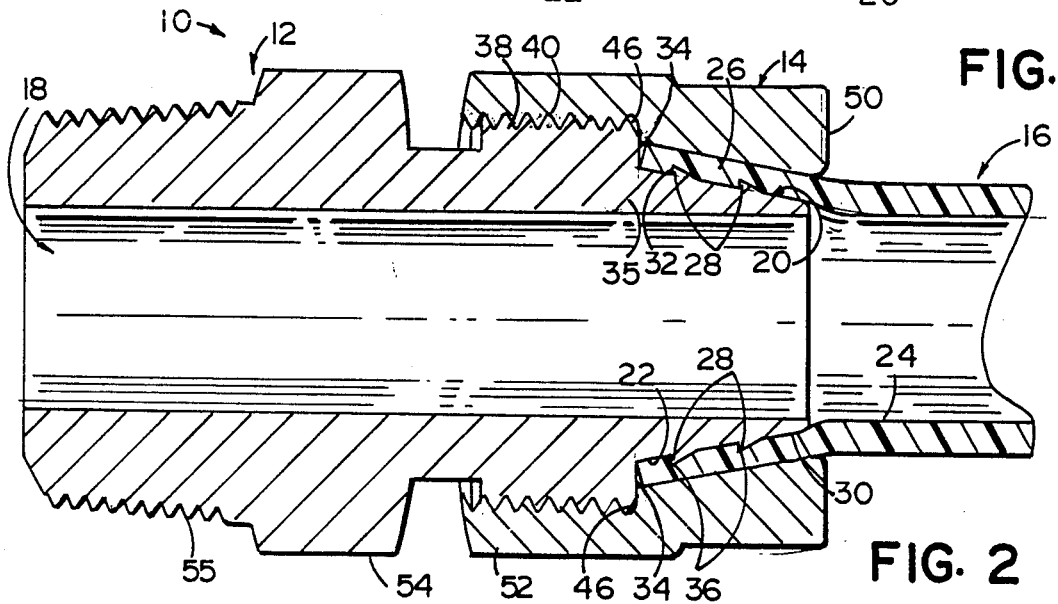
FIG. 2 is a cross-sectional view taken along the plane II—II in FIG. 1.

Hose 16 is coupled to male member 12 by inserting a frustum end 20 of the latter into the end of the hose, and then pushing the hose along and over the frustoconically-shaped exterior surface 22 of member 12. As seen in FIG. 2, the end 26 of hose 16 is flared outwardly and gradually expanded in a uniform manner as it is pushed along frustum end 20 toward an annular shoulder 34 which is located at the inward end of frustum portion 20 adjacent the end of threaded portion 38. To ensure that the hose 16 does not slip from frustum end 20 during assembly or subsequent use, a pair of spaced-apart, sharp annular barbs 28 are provided about the periphery thereof.

Figure 3:
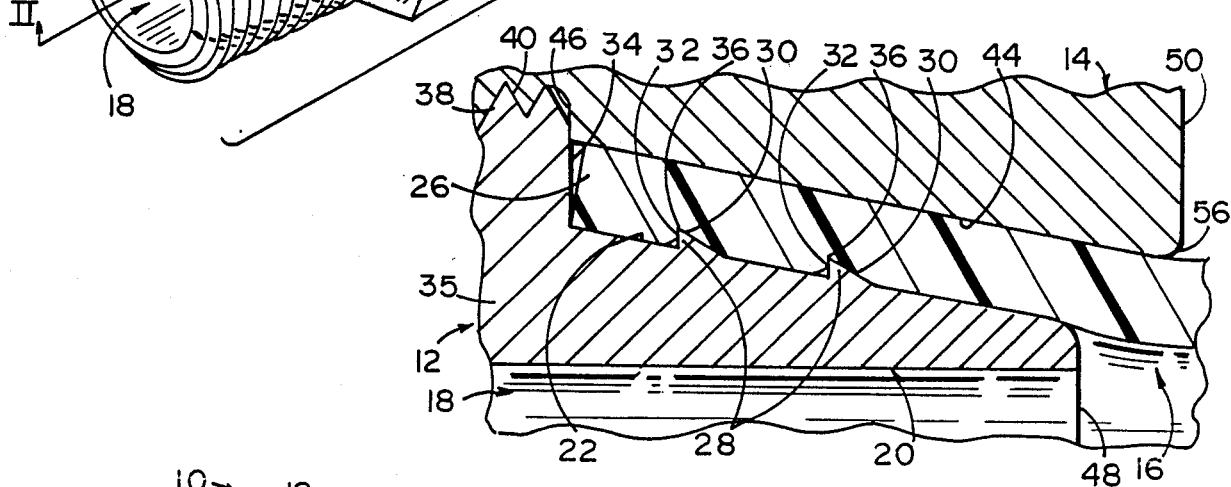
FIG. 3 is an enlarged cross-sectional view of the hose received within the connector.

Barbs 28 (FIG. 3) are preferably of a generally conical overall shape, having a wedge-shaped cross-sectional configuration which includes a gradually sloping leading surface 30 and a substantially flat rear shoulder 32. As the end 26 of hose 16 is pushed onto the frustum end 20, it rides up over the leading surfaces 30 and passes rearwardly until it abuts shoulder 34 (FIG. 2). The projecting annular edge 36 of each barb 28 is preferably made to be very sharp so that such edges bite into the inner sidewall 24 of hose 16 (FIG. 3), to thereby effectively avoid the inherent tendency of the soft, resilient polyurethane hose to pull outwardly and slip off the frustoconical end 20. As indicated above, hose which has the physical characteristics of polyurethane is difficult to couple in an effective and reliable manner. Projections which are similar to barbs 28 but which are not sharp are simply unable to effectively alleviate slippage of the hose back off the frustoconical end portion 20. While a pair of the sharp, spaced-apart barbs 28 are illustrated, this specific number of barbs is not of the essence, and within the broader aspects of the invention other numbers thereof could be utilized.

Spaced rearwardly and radially outwardly of frustum end 20 and shoulder 34 is an externally-threaded portion 38 which is adapted to engage corresponding assembly threads 40 provided on female component 14, as will be discussed further below. A hex nut portion or the like 54 which is integral with male component 12 is positioned adjacent the threaded portion 38 to facilitate assembly and/or installation of the coupling by engagement of the hex nut with a wrench. The rearwardmost or outboard end of male component 12 is provided with a threaded portion 55, by which the coupling 10 and attached hose 16 may be secured to the equipment with which it is to operate.

Female component 14 is preferably also composed of a metallic material, such as brass, although it could of course be made from other materials having the requisite characteristics. The female component 14 is fabricated as a hollow, tubular member having a central opening 42 which includes a rearward segment having assembly threads 40 and a forward segment 44 having a conical recess whose sidewalls have the same inclination as the conical surface 22 of frustum end 20 (forming the base from which the barbs 28 protrude conically outward). An annular shoulder 46 is provided between the threaded portion 40 and the angularly tapering wall of segment 44, to cooperate with (i.e. abut) shoulder 34 on male component 12 when the coupling is assembled. Further, as with male member 12, the exterior surface 57 of female component 14 includes a hex nut portion or the like 52 for engagement of a wrench to facilitate the effective assembly When connector 10 is assembled with hose 16, assembly threads 38, 40 are threaded together such that male and female components 12, 14 are drawn together. The threading continues until the inner shoulder 46 of female component 14 abuttingly engages the outer shoulder 34 of male component 12. In this position, the walls defining conical recess 44 of female member 14 concentrically overlie conical surface 22 of male member 12, such that the opposing surfaces of each such member are disposed substantially parallel with one another and lie a predetermined distance apart, to thereby establish a particular degree of compression in the wall of hose 16. In this arrangement, the outwardly-flared hose end 26 is clamped securely between the opposed conical surfaces 22, 44, and held tightly against the sharp circumferential barbs 28 in order to effectively prevent subsequent slippage of hose 16 as well as any leakage of fluid conveyed through the hose and coupling.

Both the long, parallel, conically-tapered grip exerted on the hose and the predetermined degree of hose wall compression established by the disclosed structure are important features of the concept, as are the particular type of annular barbs 28 described above (the presence of at least one of which is deemed essential for reliable and effective coupling). With respect to the particular amount of hose wall compression to be utilized, it is presently believed that a minimum reduction in wall thickness of on the order of about one-third is important to the achievement of truly reliable coupling, and that the height of the barbs 28 should be at least on the order of about one-sixteenth of an inch regardless of hose wall thickness (so long as total wall thickness reasonably exceeds that dimension).

It should be noted that in the structure described, due to the positioning of abutting shoulders 34, 46, the forward distal edge 48 of frustum end 20 is positively located at least slightly inwardly of the forward end 50 of the female member 14 and should in no event be allowed to protrude beyond end 50. This relationship is very important when coupling a soft-walled conduit, such as polyurethane hose, to a connector, since otherwise there is a significant danger of cutting hose 16, or of creating undesirably high stress concentration, at the forward end 48 of member 12 when the hose is bent sharply at the coupling during use. Furthermore, it is also deemed important for this purpose to provide a smoothly rounded outer edge configuration 49 (FIG. 3) at end 48 of conical portion 20, as well as around the inside annular edge 56 of end 50 of the female member 14.

The abutment of shoulders 34 and 46 are also specifically arranged such that the hex nut 52 provided on female component 14 is longitudinally spaced apart from hex nut 54 provided on male member 12. This construction ensures a reasonable amount of working space between these component portions and is therefore a more advantageous arrangement in comparison to abutting the hex nut portions together; that is, by spacing the nut portions 52, 54 apart, wrenches may be more easily engaged and worked.

In the assembly of hose 16 to connector 10, hose 16 is first fed through central opening 42 of female member 14, with the forward end 50 thereof being directed away from the end 26 of hose 16. The end 26 of hose 16 is then pushed onto frustum end 20 of male member 12, until the entire frustoconical surface 22 is received therewithin. Thereafter, female member 14 is slid back along hose 16 toward male member 12 and tightened down upon the latter, by engagement of threads 38 and 40, until inner shoulder 46 abuts outer shoulder 34.

It is understood that the foregoing description is merely of one preferred embodiment of the invention, and that various other embodiments as well as changes and alterations may be made without departing from the spirit and broader aspects of the invention as defined in the ensuing claims.

The embodiments of the invention in which an exclusive property or privilege is claimed are defined as follows.

1. A hose assembly comprising:

a solid-walled polyurethane hose having an inner sidewall defining an internal passage through which fluid is conveyed;

a male member having connecting means thereon and including an axial bore and a frustrum end having a substantially uniformly tapered generally conical exterior surface encircling said axial bore, said frustum end receiving an end portion of said hose in flared relation over said tapered exterior surface for attachment of the hose to such member, said frustum end further including at least one sharp annular barb encircling said tapered exterior surface to extend into said inner sidewall of said hose and prevent slippage of said hose from said frustum end;

a female member having connecting means thereon and including an axial cavity extending therethrough, said cavity receiving therein said hose end portion and said frustum end of said male member upon telescoping engagement of said female member thereover, said cavity including a generally conical portion having substantially the same uniform taper as said exterior surface of said frustum end, said female member being secured in place upon said male member by said connecting means with said conical portion positioned to contiguously overlie said flared end portion of said hose received on said frustum end exterior surface and hold such portion in tightly clamped relation therebetween with said at least one sharp annular barb embedded in said inner sidewall of said hose, thereby securing the hose in place upon the frustum end of said male member; and mutually cooperating indexing means on said male member and female member for defining a predetermined point of full telescoping relation therebetween at which said barb is fully embedded in said inner sidewall and the wall section of said flared end portion of said hose is sufficiently compressed between said male and female members to maintain the secure connection of the hose thereto without physical degradation of the hose sidewall.

2. The hose assembly of claim 1 in which said indexing means includes a first stop means on said male member adjacent said frustum end and a second stop means on said female member adjacent said conical portion, said first and second stop means being disposed in mutually abutting engagement to positively establish said predetermined point of full telescoping relationship between said male member and female member.

3. The hose assembly of claim 2 wherein at least one of said first and second stop means comprises a generally annular shoulder on one of said male member and said female member.

4. The hose assembly of claim 2 in which said connecting means on said male member includes a first threaded portion said male member further includes and a first nut portion and said connecting means on said female member includes a second threaded portion and said female member further includes a second nut portion, wherein said first and second threaded portions threadedly engage one another to secure said male and female members together, and wherein said first and second stop means abuttingly engage to further position said first and second nut portions in spaced-apart relationship, whereby tools can be more easily placed upon said nut portions and operated to thread and unthread said threaded portions of said male and female members.

5. The hose of claim 1 in which said at least one annular barb includes a tapered ramp-like face which overlies and radially symmetrically enlarges said generally conical exterior surface of said frustum end.

6. A connector for a solid, soft-walled conduit comprising:
  a. a male member including:
    i. an axial bore passing therethrough and positioned in alignment with the conduit;
    ii. a frustum portion having a free and extremity and a generally conically-shaped exterior surface gradually narrowing toward said free end and sized to receive the conduit thereover for attachment thereto;
    iii. at least one barb fixedly attached to said exterior surface of said frustum end to extend about the periphery thereof, said barb having a sharp projecting edge adapted for embedment into the inner sidewall of the conduit to secure the conduit against axial slipping along said frustum end exterior surface;
    iv. a smoothly-rounded convex annular outer surface extending between said free end extremity of said frustum portion and said conically-shaped exterior surface thereof;
    v. a threaded portion adjacent said frustum end; and
    vi. means for attachment of said male member to an external component to which the conduit is to be coupled;
  b. a female member having first and second ends and including:
    i. an axial passage extending between said first and second ends, said axial passage being sized and positioned to receive said male member and conduit at said first end;
    ii. a threaded segment in said axial passage threadedly engaging said threaded portion of said male member to connect said male and female members;
    iii. a conically converging area in said axial passage adjacent said threaded segment, said conical area having substantially the same angle of convergence and orientation as said generally conical exterior surface of said frustum end of said male member so that when said male and female members are interconnected said conical area overlies said exterior surface of said frustum end with the adjacent opposing surfaces being disposed generally parallel with one another and sufficiently close to receive said conduit therebetween and tightly hold the conduit in place against said barb; and limiting means on said male and female member intermediate said threads and opposing surfaces to position said opposing surfaces at a predetermined distance from each other and
    iv. a smoothly-rounded outwardly annularly flared surface defining the terminus of said axial passage at said second end;
  c. whereby said conduit exits said female member through said outwardly-flaring annular section and extends beyond said male member by passing over said smoothly-rounded convex annular surface a the free end of said male member.

7. The connector of claim 6 in which said frustum portion of said male member has a length in relation to said female member such that said free end extremity is disposed substantially within said axial passage of said female member when said threaded section and threaded portion are fully engaged.

8. The connector of claim 7 in which said frustum portion has a length such that said free end extremity thereof is located inwardly of said second end of said female member.

9. The connector of claim 6 in which said conically-converging area of said axial passage in said female member is defined by a conically extending wall within said female member, such wall being located adjacent to and spaced from said exterior surface of said frustum end, and said limiting means on said male and female members including mutually-cooperating index means for determining the point of full engagement of said male and female members such that said predetermined distance is established between said conically-extending wall and said exterior surface of said frustum end at said point, said predetermined distance being at least slightly less than the wall thickness of the soft-walled conduit to be coupled by said connector.

10. The connector of claim 9, in which said index means includes abutments on said male member and female member located so as to come into contact with one another at said point of full engagement.

* * * * *